US010567762B2

(12) United States Patent
Park et al.

(10) Patent No.: US 10,567,762 B2
(45) Date of Patent: Feb. 18, 2020

(54) METHOD, APPARATUS, AND COMPUTER-READABLE RECORDING MEDIUM FOR EFFICIENTLY PERFORMING EMBEDDED COMPRESSION OF DATA

(71) Applicant: SAMSUNG ELECTRONICS CO., LTD., Suwon-si (KR)

(72) Inventors: Chan-sik Park, Hwaseong-si (KR); Jae-moon Kim, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/574,536

(22) PCT Filed: Jun. 1, 2016

(86) PCT No.: PCT/KR2016/005813
§ 371 (c)(1),
(2) Date: Nov. 16, 2017

(87) PCT Pub. No.: WO2016/195378
PCT Pub. Date: Dec. 8, 2016

(65) Prior Publication Data
US 2018/0167614 A1 Jun. 14, 2018

(30) Foreign Application Priority Data

Jun. 1, 2015 (KR) .................. 10-2015-0077484

(51) Int. Cl.
*H04N 19/119* (2014.01)
*H04N 19/50* (2014.01)
(Continued)

(52) U.S. Cl.
CPC ......... *H04N 19/119* (2014.11); *H04N 19/117* (2014.11); *H04N 19/176* (2014.11); *H04N 19/463* (2014.11); *H04N 19/50* (2014.11)

(58) Field of Classification Search
CPC .. H04N 19/117; H04N 19/176; H04N 19/428; H04N 19/463; H04N 19/50; H04N 19/51; H04N 19/82; H04N 19/119
(Continued)

(56) References Cited

U.S. PATENT DOCUMENTS 6,208,689 B1    3/2001  Ohira et al.
7,190,284 B1 *  3/2007  Dye .............. G06F 12/023
                                              341/51
(Continued)

FOREIGN PATENT DOCUMENTS

CN    103891277 A    6/2014
EP    0920204 A1     6/1999
(Continued)

OTHER PUBLICATIONS

Dieison Silveira et al., "A New Differential and Lossless Reference Frame Variable-Length Coder: An Approach for High Definition Video Coders", 2014 IEEE International Conference on Image Processing (ICIP), IEEE, Oct. 27, 2014, pp. 5641-5645, XP032963808. (5 pages total).
(Continued)

*Primary Examiner* — William C Vaughn, Jr.
*Assistant Examiner* — Jae N Noh
(74) *Attorney, Agent, or Firm* — Sughrue Mion, PLLC

(57) ABSTRACT

A method of performing embedded compression (EC) on image data includes receiving decoded image data; determining a block size of image data waiting for embedded compression from among the received image data; and comparing the determined block size of the image data waiting for embedded compression with an EC block size that is an embedded compression unit, the method further including: if the determined block size of the image data waiting for embedded compression is equal to or greater
(Continued)

than the EC block size, embedding and compressing the received image data; and if the determined block size of the image data waiting for embedded compression is smaller than the EC block size, storing tag information of the received image data.

12 Claims, 15 Drawing Sheets

(51) Int. Cl.
*H04N 19/176* (2014.01)
*H04N 19/463* (2014.01)
*H04N 19/117* (2014.01)

(58) Field of Classification Search
USPC .................................................. 375/240.24
See application file for complete search history.

(56) References Cited

U.S. PATENT DOCUMENTS

| | | | |
|---|---|---|---|
| 7,971,132 B2* | 6/2011 | Mele, Jr. ............... | H04L 65/604 715/201 |
| 9,860,530 B2 | 1/2018 | Lee et al. | |
| 2007/0005911 A1* | 1/2007 | Yang ..................... | G06F 12/023 711/154 |
| 2010/0265392 A1 | 10/2010 | Shao et al. | |
| 2014/0317340 A1* | 10/2014 | Nishina ................. | G06F 3/0608 711/103 |

FOREIGN PATENT DOCUMENTS

| | | |
|---|---|---|
| GB | 2339989 A | 2/2000 |
| KR | 10-2007-0061269 A | 6/2007 |

OTHER PUBLICATIONS

Xuena Bao et al., "An Advanced Hierarchical Motion Estimation Scheme With Lossless Frame Recompression for Ultra High Definition Video Coding", Multimedia and Expo (ICME), 2010 IEEE International Conference on, IEEE, Piscataway, NJ, USA, Jul. 19, 2010, pp. 820-825, XP031761411. (6 pages total).

Liu Song et al., "An Adaptive Bandwidth Reduction Scheme for Video Coding", IEEE International Symposium on Circuits and System, ISCAS 2010, May 30, 2010 thru Jun. 2, 2010, Paris, France, IEEE, May 30, 2010, pp. 401-404, XP031724957. (4 pages total).

Sezgin Sucu et al., "ACE: A Resource-Aware Adaptive Compression Environment", Information Technology: Coding and Computing [Computers and Communications], 2003, Proceedings, ITCC 2003, International Conference on Apr. 28, 2003 thru Apr. 30, 2003, Piscataway, NJ, USA, IEEE, Apr. 28, 2003, pp. 183-188, XP010638613. (6 pages total).

Communication dated Mar. 12, 2018 by the European Patent Office in counterpart European Patent Application No. 16803733.1.

Communication dated Jul. 13, 2018, from the European Patent Office in counterpart European Application No. 16803733.1.

Yibo Fan et al. "In-Block Prediction-Based Mixed Lossy and Losesless Reference Frame Recompression for Next-Generation Video Encoding" IEEE Transactions on Circuits and Systems for Video Technology, vol. 25, No. 1, Jan. 2015 (pp. 112-124).

Communication issued by the Korean Intellectual Property Office dated Aug. 11, 2016 in counterpart Korean Patent Application No. 10-2015-0077484.

Communication issued by the International Searching Authority dated Aug. 24, 2016 in counterpart International Patent Application No. PCT/KR2016/005813 (PCT/ISA/210 & PCT/ISA/237).

Jaemoon Kim et al., "A Lossless Embedded Compression Algorithm for High Definition Video Coding", 2009 IEEE International Conference on Multimedia and Expo, Jun. 28, 2009-Jul. 3, 2009, pp. 193-196, DOI: 10.1109/ICME.2009.5202469.

Jaemoon Kim et al., "A Lossless Embedded Compression Using Significant Bit Truncation for HD Video Coding", IEEE Transactions on Circuits and Systems for Video Technology, Jun. 2010, pp. 848-860, vol. 20, No. 6, DOI: 10.1109/TCSVT.2010.2045923.

Yu-Yu Lee et al., "An Efficient Lossless Embedded Compression Engine Using Compacted-FELICS Algorithm", 2008 IEEE International SOC Conference, Sep. 17-20, 2008, pp. 233-236 (total 4 pages), DOI: 10.1109/SOCC.2008.4641518.

Chih-Chi Cheng et al., "Multi-Mode Embedded Compression Codec Engine for Power-Aware Video Coding System", IEEE Workshop on Signal Processing Systems Design and Implementation, Nov. 2-4, 2005, pp. 532-537, DOI: 10.1109/SIPS.2005.1579925.

Communication dated Oct. 14, 2019, from the State Intellectual Property Office of People's Republic of China in counterpart Application No. 201680031777.1.

\* cited by examiner

METHOD, APPARATUS, AND COMPUTER-READABLE RECORDING MEDIUM FOR EFFICIENTLY PERFORMING EMBEDDED COMPRESSION OF DATA

TECHNICAL FIELD

The present disclosure relates to an embedded compression method which is a data processing method for solving a memory capacity and a bandwidth problem in processing of a video image, and more particularly, a method, apparatus, and a recording medium for more efficiently performing embedded compression when basic decoded data does not satisfy an embedded block size.

BACKGROUND ART

Systems that process video data require high bandwidth memory and internal communication architectures (such as a system bus, etc.). Such excessive memory access and bandwidth requirements are a major cause of system performance degradation and power consumption.

Various techniques have been applied to overcome the problem of frame memory capacity and bandwidth, among which there is an embedded compression method. The embedded compression method is a method of compressing data stored in a memory and storing the compressed data, and decompressing the data when loading the data.

However, the decoded data corresponding to a material for embedded compression may be smaller than an embedded compression block size. In this case, in order to perform embedded compression after a sufficient amount of decoded data that satisfies the embedded compression block size is prepared, previously received decoded data is stored in the memory for performing subsequent embedded compression, additionally decoded data is received, and, if embedded compression is enabled, the stored data is loaded from the memory.

Such an operation may increase a bus bandwidth to be occupied for embedded compression and may deteriorate the overall performance of an image system.

DETAILED DESCRIPTION OF THE INVENTION

Technical Problem

The present disclosure solves the above problems of the conventional art and provides more efficient performing of embedded compression than when a size of decoded data is smaller than an embedded compression block size.

The present disclosure also provides determining an embedded compression block size in order to prevent a size of decoded data from being smaller than the embedded compression block size.

Technical Solution

A typical configuration of the present disclosure for achieving the above object is as follows.

According to an embodiment of the present disclosure, a method of performing embedded compression (EC) on image data includes receiving decoded image data; determining a block size of image data waiting for embedded compression from among the received image data; and comparing the determined block size of the image data waiting for embedded compression with an EC block size that is an embedded compression unit, the method further including: if the determined block size of the image data waiting for embedded compression is equal to or greater than the EC block size, embedding and compressing the received image data; and if the determined block size of the image data waiting for embedded compression is smaller than the EC block size, storing tag information of the received image data.

The method may further include: if the determined block size of the image data waiting for embedded compression is smaller than the EC block size, a) storing the image data waiting for embedded compression; and b) if additional decoded image data to be embedded compressed is input, storing the additional image data based on the tag information.

The tag information may be received from an Intellectual Property (IP) core of a codec.

The tag information may indicate that the decoded image data is non-compressed image data.

According to another embodiment of the present disclosure, a method of performing embedded compression (EC) on image data includes receiving decoded image data; determining a block size of image data to be embedded compressed from among the received image data; and comparing the determined block size with a first EC block size for embedded compression, the method further including: if the determined block size is equal to or greater than the first EC block size, embedding and compressing the received image data; and if the determined block size is smaller than the first EC block size, a) embedding the image data, which is to be embedded compressed, in a second EC block size determined according to the determined block size; and b) storing the embedded compressed image data and tag information of the embedded compressed data.

The second EC block size may be determined based on a vertical block size of the received image data.

The vertical block size of the second EC block size may be a maximum common divisor of vertical block sizes that the received image data may have.

According to another embodiment of the present disclosure, the tag information is compressed.

According to an embodiment of the present disclosure, an apparatus for performing embedded compression (EC) on image data includes: an input unit configured to receive decoded image data; a control unit configured to determine a block size of image data waiting for embedded compression from among the received image data and compare the determined block size of the image data waiting for embedded compression with an EC block size that is an embedded compression unit; and an embedded compression unit configured to, if the determined block size of the image data waiting for embedded compression is equal to or greater than the EC block size, embedded compress the received image data, and if the determined block size of the image data waiting for embedded compression is smaller than the EC block size, store tag information of the received image data.

The apparatus may further include: if the determined block size of the image data waiting for embedded compression is smaller than the EC block size, a storage unit configured to a) store the image data waiting for embedded compression, and b) if additional decoded image data to be embedded compressed is input, store the additional image data based on the tag information.

The tag information may be received from an Intellectual Property (IP) core of a codec.

The tag information may indicate that the decoded image data is non-compressed image data.

According to another embodiment of the present disclosure, an apparatus for performing embedded compression (EC) on image data includes an input unit configured to receive decoded image data; a control unit configured to determine a block size of image data to be embedded compressed from among the received image data and compare the determined block size with a first EC block size for embedded compression; an embedded compression unit configured to, if the determined block size is equal to or greater than the first EC block size, embedded compress the received image data, and, if the determined block size is smaller than the first EC block size, embedded compress the image data, which is to be embedded compressed, in a second EC block size determined according to the determined block size; and a storage unit configured to store the embedded compressed image data and tag information of the embedded compressed data.

The second EC block size may be determined based on a vertical block size of the received image data.

The vertical block size of the second EC block size may be a maximum common divisor of vertical block sizes that the received image data may have.

According to another embodiment of the present disclosure, the tag information is compressed.

According to an embodiment of the present disclosure, there is provided a computer-readable recording medium on which a program for executing the above-described method is recorded.

In addition, another method for implementing the present disclosure, another system, and a computer-readable recording medium for recording a computer program for executing the method are further provided.

Advantageous Effects

According to the embodiments, embedded compression may be performed more efficiently than when a size of decoded data is smaller than an embedded compression block size, and the embedded compression block size may be determined in order to prevent the size of the decoded data from being smaller than the embedded compression block size.

BEST MODE

Figure 1:
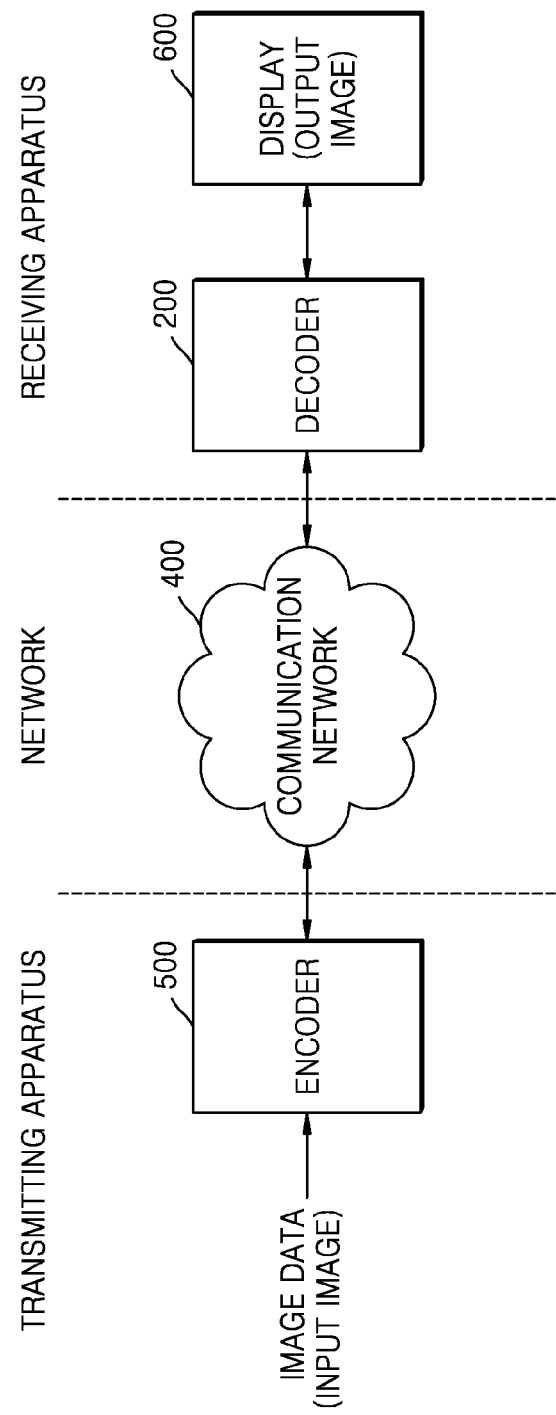
FIG. 1 schematically shows a system for processing image data using a video codec.

According to an embodiment of the present disclosure, a method of performing embedded compression (EC) on image data includes receiving decoded image data; determining a block size of image data waiting for embedded compression from among the received image data; and comparing the determined block size of the image data waiting for embedded compression with an EC block size that is an embedded compression unit, the method further including: if the determined block size of the image data waiting for embedded compression is equal to or greater than the EC block size, embedding and compressing the received image data; and if the determined block size of the image data waiting for embedded compression is smaller than the EC block size, storing tag information of the received image data.

MODE OF THE INVENTION

The following detailed description of the present disclosure refers to the accompanying drawings, which illustrate, by way of illustration, specific embodiments in which the present disclosure may be practiced. These embodiments are described in sufficient detail to enable those of ordinary skill in the art to practice the invention. It should be understood that the various embodiments of the present disclosure are different, but need not be mutually exclusive. For example, certain features, structures, and characteristics described herein may be implemented and changed without departing from the spirit and scope of the present disclosure, from one embodiment to another. It should also be understood that the position or arrangement of individual components within each embodiment may be varied without departing from the spirit and scope of the present disclosure. Accordingly, the following detailed description is not to be taken in a limiting sense, and the scope of the present disclosure should be construed as encompassing the scope of the appended claims and all such equivalents. Like reference numerals refer to the same or similar components throughout the several views.

Hereinafter, embodiments of the present disclosure will be described in detail with reference to the accompanying drawings so that those of ordinary skill in the art may easily carry out the present disclosure.

FIG. 1 schematically shows a system for processing image data using a video codec.

Codec is collectively referred to as an encoder and a decoder, and the image data is encoded in an encoder 500 of a transmitting apparatus and transmitted to a receiving apparatus through a wired/wireless communication network 400. The input image data is encoded through transformation, quantization, and entropy coding, and final output data of the encoder 500 generated through entropy coding is a bit stream.

The communication network 400 serves to connect the encoder 500 of the transmitting apparatus and the decoder 200 of the receiving apparatus. That is, the communication network 400 refers to a communication network that provides a connection path for transmitting and receiving data. That is, the communication network 400 according to an embodiment of the present disclosure may be configured without regard to communication modes such as wired communication and wireless communication, and may be configured as various communication networks such as a LAN (Local Area Network), a MAN (Metropolitan Area Network), WAN (wide area network), and the like. The communication network 400 referred to herein may be the well-known Internet or World Wide Web (WWW). However, the communication network 400 may include, at least in part, a known wire/wireless data communication network, a known telephone network, or a known wire/wireless television communication network, without being limited thereto.

When the bit stream of the encoded image data is received, the decoder 200 of the receiving apparatus entropy-decodes the received bit stream, and inversely quantizes and inversely transforms (not shown) the received bit stream to reconstruct an image. Such a reconstructed image is further subjected to a filtering process, and a subjective image quality of the image is improved through the filtering.

The filtered reconstructed image is stored in a DPB (Decoded Picture Buffer, not shown) in a unit of filters, and then a picture stored in the DPB is referred to in a motion prediction of the image to be decoded.

A display 600 displays the decoded picture stored in the DPB.

On the other hand, the display includes a display unit of a reproducing apparatus for receiving image data, and the display has been developed from a low-resolution small-sized screen to a high-resolution large-sized screen, thereby increasing an amount of image data to be processed by the encoder and the decoder.

Therefore, the newly established standard codec such as HEVC (High Efficiency Video Coding) or AVS (Audio Video Coding Standard) aims at better compression performance compared to the previous H.264/AVC (Advanced Video Coding). In fact, HEVC is known to have about twice the subjective coding efficiency at the same bit rate as H.264/AVC.

One of main goals of HEVC development is to efficiently encode UHD (Ultra High Definition) images. To this end, the maximum size of a pixel range to perform prediction, quantization, and transformation was a 16×16 size block in H.264/AVC, but it increased to a 64×64 size block in HEVC and algorithm of related coding tools also was designed to achieve good coding efficiency in a high resolution image.

An amount of data of a reference image for encoding and decoding increases as well as an amount of data of an input image for processing a high-quality image such as UHD. A hardware structure for video image compression generally uses an externally shareable frame memory to store the input and reference images. Decoding of a high resolution video such as UHD generates a large amount of memory access.

A decoding system requires high bandwidth memory and internal communication architectures (such as a system BUS, etc.) Such excessive memory access and bandwidth requirements are major causes of system performance degradation and power consumption.

Various techniques have been applied to overcome the problem of frame memory capacity and bandwidth, among which there is an embedded compression method. The embedded compression method is a method of compressing and storing data stored in s memory and decompressing the data when loading the data.

Figure 2:
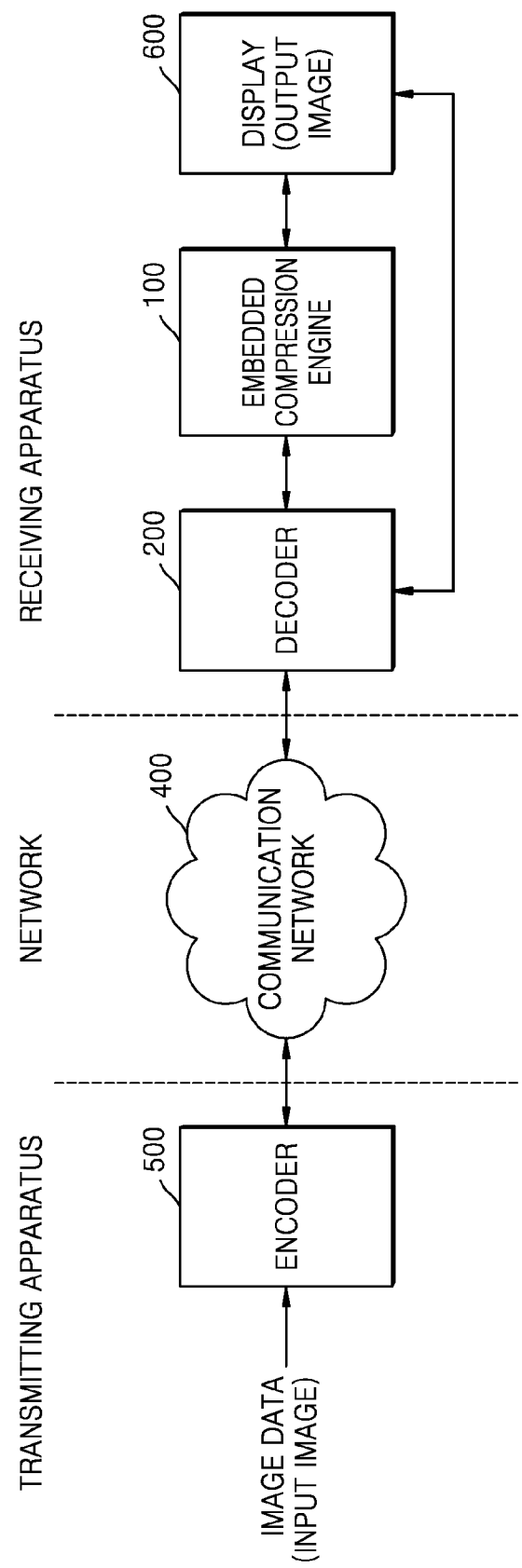
FIG. 2 schematically illustrates a system for processing image data using a video codec, including an embedded compression engine.

FIG. 2 schematically illustrates a system for processing image data using a video codec, including an embedded compression engine.

The system of FIG. 2 is generally similar to a system of FIG. 1, but unlike the system of FIG. 1, there is a difference in that embedded compression is performed between decoding a bit stream and displaying a decoded picture.

The image data is encoded in the encoder 500 of a transmitting apparatus and transmitted to a receiving apparatus through the wired/wireless communication network 400. The input image data is encoded through transformation, quantization, and entropy coding, and the final output data of the encoder 500 generated through entropy coding is a bit stream.

The communication network 400 serves to connect the encoder 500 of the transmitting apparatus and the decoder 200 of the receiving apparatus, includes a dedicated line, a LAN, a VAN, an intranet, a private telephone network, a public telephone network, a PSTN network, and a combination thereof, and includes a wired Internet, a wireless Internet, and a mobile wireless communication network as a data communication network of a comprehensive meaning that enables each network configuration entity shown in FIG. 1 to communicate smoothly with each other.

Upon reception of the bit stream of the encoded image data, the decoder 200 of the receiving apparatus entropy-decodes the received bit stream, and inversely quantizes and inversely transforms (not shown) the image to reconstruct an image. The reconstructed image is further subjected to a filtering process, and a decoded picture output from a filter is transmitted to an embedded compression engine 100.

The embedded compression engine 100 embeds and compresses the decoded picture in a unit of blocks and stores the compressed picture in a memory (not shown). When there is a request from the decoder 200 or the display 600, the embedded compression engine 100 decompresses and sends compressed block data to the decoder 200 or the display 600.

The display 600 displays an image signal received from the embedded compression engine 100 or the decoder 200 through a screen or the like.

Since the input signal of the embedded compression engine is an output of an output filter which is a final processing step of the decoder and the output filter processes data using a boundary value of a peripheral block in view of the nature of the video codec, embedded compression may not also proceed with a block sync and proceeds between blocks.

On the other hand, embedded compression has lossy compression and lossless compression.

Since a compression ratio of lossy compression is fixed, a size of compressed data is constant, and the number of accesses of an external memory as well as a size of a memory to be used may be reduced. In the case of lossy compression, a certain memory bandwidth may be guaranteed, while image loss is caused. Furthermore, since a frame to be used as a reference image is lost, there is a problem that an error spreads as the image is encoded, and the loss becomes more serious.

On the other hand, lossless compression does not have loss of a reference image to be stored, while it is a variable compression method in which the size of compressed data is not constant. Therefore, lossless compression needs to use separate tag information because lossless compression may not have a constant memory bandwidth. Due to the variable compression nature of lossless compression, when lossless compression is used, a bandwidth of the external memory may be reduced, but a size of the memory used is not reduced.

The compression ratio of currently used embedded compression is about 2:1 to 4:1, and performs block unit compression.

Figure 3:
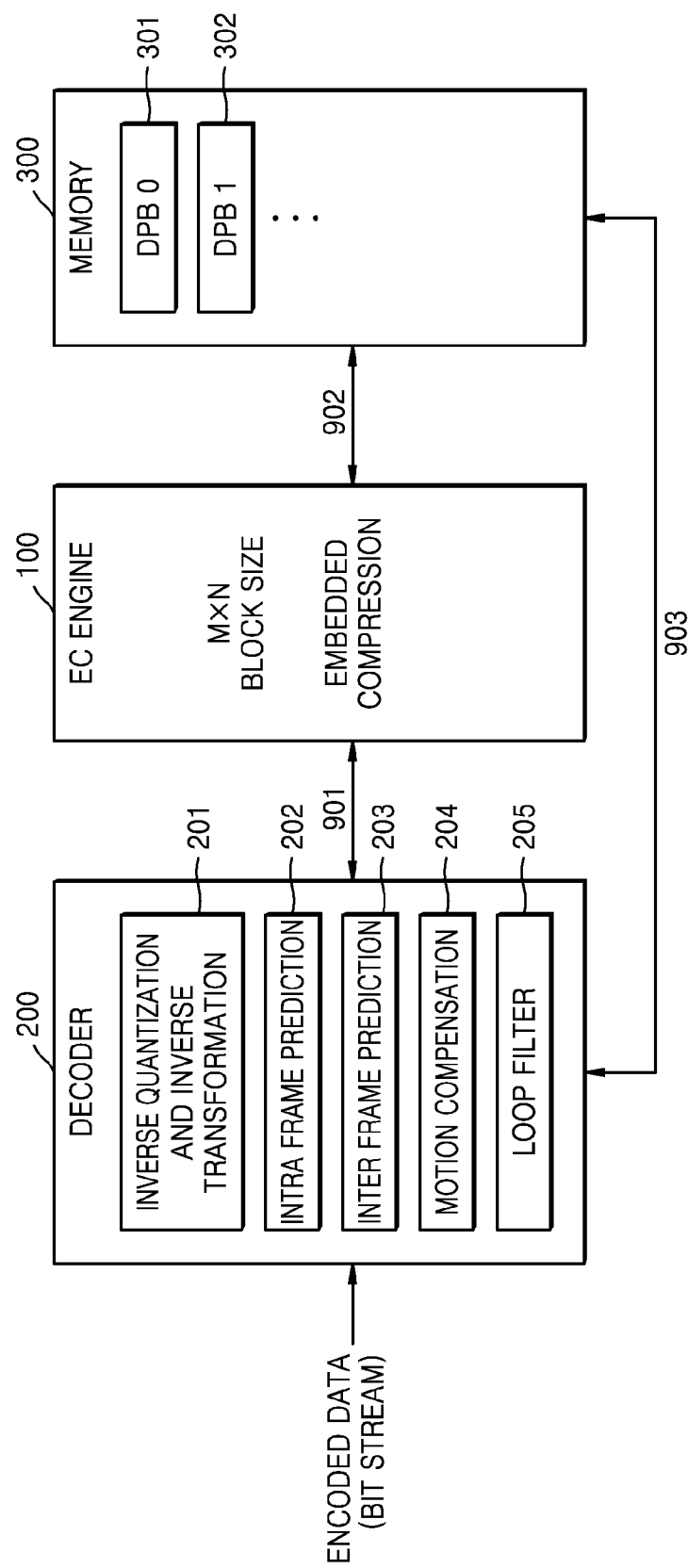
FIG. 3 shows a detailed block diagram of an embedded compression engine, a decoder and a memory in a system of FIG. 2.

FIG. 3 shows a detailed block diagram of the embedded compression engine 100, the decoder 200 and the memory 300 in a system of FIG. 2.

The decoder 200 of FIG. 3 assumes the case of an HEVC decoder and includes core encoding techniques included in a main profile. The HEVC performs encoding of block units as in previous compression standards and uses intra frame prediction and motion prediction techniques similar to H.264/AVC in order to generate prediction signals of block units.

An image predicted by an HEVC encoder is quantized in block units, resulting in blocking phenomenon due to a lost pixel value. In order to reduce the blocking phenomenon, the HEVC additionally uses a sample adaptive offset (SAO) and an adaptive loop filter (ALF) to a deblocking filter which is a post-processing filter of H.264/AVC, and thus an image quality is improved and coding efficiency is improved.

HEVC shows about a 43% bit reduction compared to a H.264/AVC high profile. However, in a motion compensation (MC) process, use of post-processing filters such as a 8-tap filter, a deblocking filter, a sample adaptive offset, an adaptive loop filter, etc. increases the computational complexity of a decoder.

As mentioned above, since a format of final output data of an encoder is a bit stream, an input of the decoder also is a bit stream. Decoded image data passed through the output filter of the decoder 200 is transferred to the EC engine 100 via a system bus 901 and embedded compressed in an M×N block size in the EC engine 100.

The embedded compression engine 100 shown in FIG. 3 may be implemented in hardware or software, and the embedded compression engine 100 may be implemented in a form included in the decoder 200.

The image data embedded compressed in the M×N block size in the EC engine 100 is transferred to the memory 300 through the system bus 902 again.

The embedded compressed image data transferred to the memory is stored in a DPB (Decoded Picture Buffer). At this time, if the memory 300 is a DDR RAM (Double Data Rate Random Access Memory), random access may be guaranteed.

In the case of embedded compression, compression is performed mainly in units of M×N blocks for compression efficiency. After compression in units of M×N blocks, a resultant about of bits (an amount of data) is fixed or variable depending on loss and lossless embedded compression.

If a compression rate of lossy embedded compression is fixed, there is no need to separately transmit the amount of bits compressed in units of M×N blocks, and "a result of M×N embedded compression is that the amount of bits=M×N×bit-depth ×compression rate".

On the other hand, in the case of lossless embedded compression, a resultant amount of bits of embedded compression has a variable length, and therefore tag information for a result of embedded compression of each M×N block size must be separately managed. The tag information is stored in the same region as the embedded compressed data or is stored in an independent region for only the tag information and is managed as a fixed tag bit. Therefore, when reading the embedded compressed data, information about the amount of bits is first read from the tag information and then the corresponding amount of bits is read.

Generally, the tag information is not compressed separately. However, when a data size of the image is large, since an amount of the tag information to be managed increases, the tag information may also be compressed and stored as needed. The compressed and stored tag information is further decompressed when the tag information stored for reading the embedded compressed data is called.

Experimental results show that when the embedded compression method is used, motion compensation and reconstruction ratio are reduced to 66% in the AVS 2.0 decoder compared to the case where embedded compression is not used.

Figure 4:
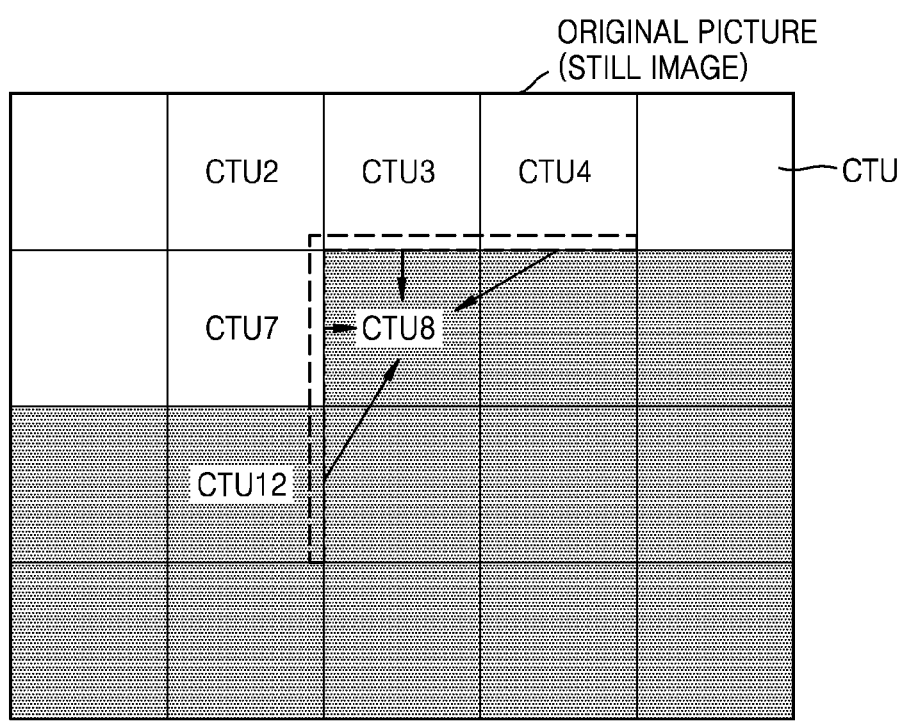
FIG. 4 is a diagram for explaining inter-frame prediction coding.

FIG. 4 is a diagram for explaining inter-frame prediction coding.

FIG. 4 shows a characteristic of using data of other blocks in order to perform inter-frame prediction coding in an encoder. As a result, a filter of a decoder performs filtering across the blocks.

For example, the HEVC is composed of a set of still images over time, and the encoder receives and processes image data in units of one still image. The input still image is split into blocks. In this case, the split block is a CTU (Coding Tree Unit) that is a basic unit of encoding, and the encoder sequentially encodes each split CTU.

An HEVC encoder may split and encode each CTU into CUs (Coding Units) for efficient encoding. At this time, the CU may be split into PU (Prediction Unit) again for more accurate prediction within each CU. As each name implies, the CU is a unit of a block in which coding is performed and the PU is a unit of a block in which prediction is performed.

The HEVC codec uses two modes of inter-frame prediction and intra-frame prediction, and inter-frame prediction coding is a compression method that reduces an amount of data by eliminating spatial redundancy. Since there is a large similarity between pixel values of spatially close distances in an image, a current block is spatially predicted by referring to samples already reconstructed in the vicinity of a block to be currently encoded.

In intra-frame prediction, a neighboring reference sample is a value before post-processing filtering is applied to a reconstructed pixel value, not a pixel value of an original image and is an encoded and reconstructed value. Therefore, the neighboring reference sample may be used as a reference sample of an encoder and a decoder.

FIG. 4 is a view of one picture split into CTUs of a certain size. The split CTUs are encoded in order from the top left to the bottom right. The encoded CTU is reconstructed and stored in a DPB in the same manner as in the encoder and the decoder, and then referred to when encoding a next CTU.

For example, FIG. 4 shows a reference structure and a state of the DPB when an eighth CTU is encoded. A dark region indicates a region where encoding is not yet performed, and a bright region indicates the encoded and the reconstructed CTUs are stored in the DPB. Intra-frame prediction for the eighth CTU refers to a portion indicated by a dotted line, and performs intra-frame prediction on the CTU. That is, boundary values of CTU3, CTU4, CTU7 and CTU12 are used as reference samples.

In the case of FIG. 4, since CTU3, CTU4, and CTU7 are encoded and reconstructed CTUs, their values may be used as reference samples, whereas since CTU12 has not yet been encoded, CTU12 has no reference sample. If there is no reference sample, a reference sample is filled through padding.

One CTU may be split into a plurality of CUs and one CU may be split into a plurality of PUs. The specific intra-frame prediction method and direction may vary depending on a prediction mode of each PU and a mode of each CU but detailed descriptions thereof are omitted.

For data processing of an upper block, the filter of the decoder performs filtering between the blocks according to the characteristics of a video codec encoder using data of a lower block.

Figure 5:
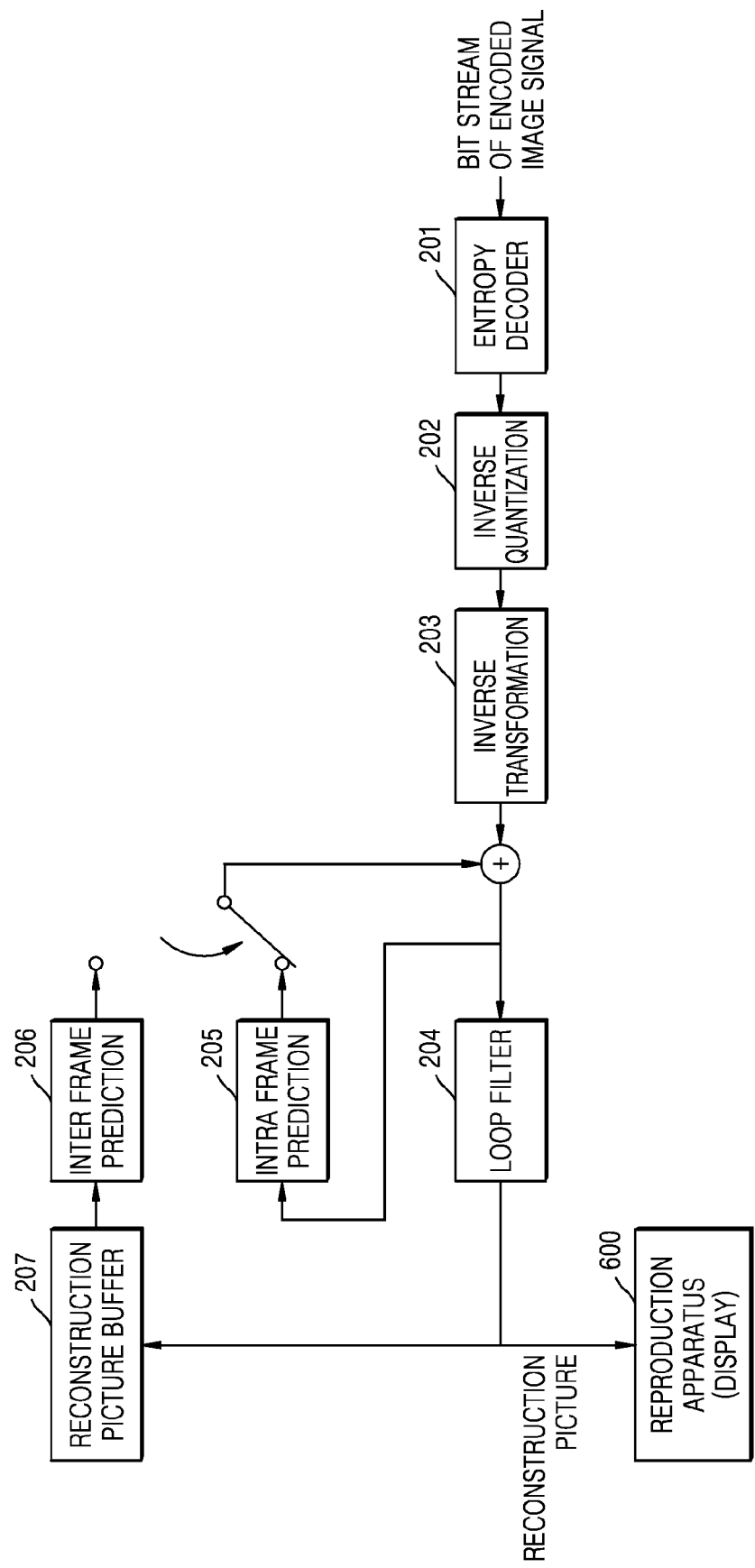
FIG. 5 shows a block diagram of a decoder to which an in-loop filter scheme is applied.

FIG. 5 shows a block diagram of a decoder to which an in-loop filter scheme is applied.

In a reconstructed picture that has undergone an inverse transform process, a blocking artifact and a ringing phenomenon may occur due to a quantization error, thereby causing a problem that a subjective image quality of a reconstructed image is deteriorated. This problem of subjective quality deterioration occurs in all video codecs using quantization, and various algorithms have been developed to improve the problem. Typically, there is a method of improving subjective image quality by filtering the reconstructed picture.

Such a filtering method is divided into a post-processing filter method and an in-loop filter method of FIG. according to whether a filtered picture is used as a reference picture in an inter-frame prediction mode.

The post-processing filter method is a method of filtering a reconstructed picture output from a decoder and then displaying a filtered picture. In such a post-processing filter method, filtering is performed separately from the outside of the decoder, and filtering is performed just before display of a reconstructed image, which is an output of a video decoder.

Unlike this, the in-loop filter method shown in FIG. 5 includes a filtering technique itself as a standard in the decoder. In particular, the in-loop filter method applies filtering to a reconstructed picture, and not only outputs the reconstructed picture, but also inserts the reconstructed picture into a DPB so that a filtered picture may be used as a reference picture in an inter-frame prediction mode.

Since the filtered picture is used as the reference picture in the inter-frame prediction mode, not only the subjective picture quality due to filtering but also the coding efficiency is improved in the inter-frame prediction mode. This is because more accurate motion prediction and compensation are possible when a filtered picture is used as a reference picture than when a reconstruction picture having blocking deterioration or ringing phenomenon is used as a reference picture.

However, the in-loop filtering method has an advantage of improving subjective image quality and encoding efficiency, but requires additional calculation in a process of filtering the reconstruction picture of the encoder and the decoder. In particular, the deblocking filter loads reconstructed pixels stored in a memory when performing filtering, performs filtering, and stores the filtered pixels in the memory again, which causes frequent memory access.

In addition, the deblocking filter has a complexity in a filtering operation itself, and thus has a high complexity in the decoder due to the overhead of such operation complexity and memory access.

HEVC uses two in-loop filters of a deblocking filter and a sample adaptive offset filter (SAO), to solve an image quality degradation problem caused by a quantization error.

In FIG. 5, the deblocking filter is used to remove blocking deterioration in the reconstructed picture, and the SAO is used to remove the ringing phenomenon. Of the two types of in-loop filters, the deblocking filter is first applied to the reconstruction picture, and the SAO is applied to the picture to which the deblocking filter is applied.

Figure 6:
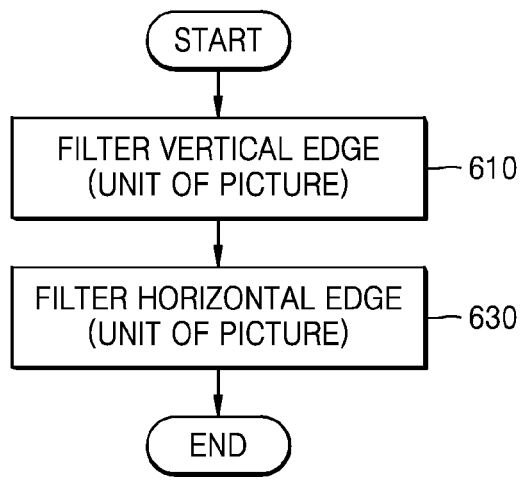
FIG. 6 is a flowchart of an edge filtering method of a deblocking filter of high efficiency video coding (HEVC).

FIG. 6 is a flowchart of an edge filtering method of a deblocking filter of HEVC.

Since HEVC performs prediction, transformation and quantization in units of blocks, discontinuity of reconstruction pixel values may occur at a block boundary. Therefore, in order to remove blocking deterioration occurring at the block boundary, filtering is basically required for block boundaries of all PU or TU. However, the HEVC performs filtering only at the boundary of a PU or a TU located at an 8×8 block boundary, considering a computational complexity of deblocking filtering.

Blocking degradation occurs both on a vertical edge and on a horizontal edge. In order to remove discontinuity of such reconstruction pixels, filtering should be performed on vertical and horizontal edge directions in a picture. H.264/AVC first performs filtering (610) on vertical edges in a horizontal direction in units of macroblocks and performs filtering (630) on horizontal edges in a vertical direction.

Unlike this, as shown in FIG. 6, the HEVC deblocking filter performs filtering on vertical edges of all block boundaries of a picture to be currently reconstructed in a horizontal direction and then filtering on horizontal edges in a vertical direction.

Such a filtering structure has an advantage of facilitating parallel processing of the deblocking filter.

Figure 7:
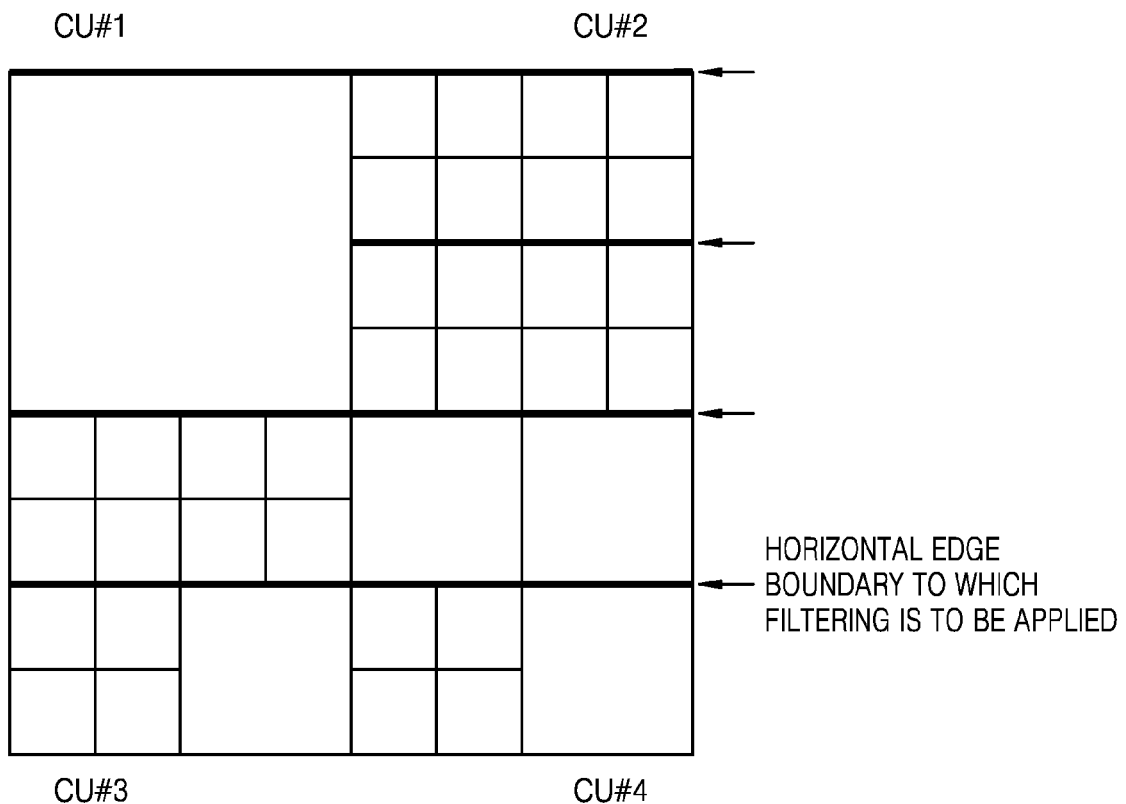
FIG. 7 is a diagram illustrating an example of a horizontal edge boundary to which filtering is applied in one coding tree unit (CTU).

FIG. 7 is a diagram illustrating an example of a horizontal edge boundary to which filtering is applied in one CTU.

FIG. 7 shows a location of a horizontal edge boundary where HEVC deblocking filtering is to be performed when a 32×32 CTU is split and coded into four 16×16 CUs.

In FIG. 7, CU#1 is an example where a 16×16 CU is split into a 16×16 PU and a 16×16 TU. In the CU, there is no boundary between the PU and the TU. Therefore, filtering is performed only on an upper horizontal edge boundary of CU#1. Here, a boundary of the CU is always located on an 8×8 block boundary, which is a boundary between the PU and the TU, and thus filtering is always performed.

CU#2 is an example where a 16×16 CU is split into two PUs of 8×16 size and is split into 4×4 TUs of a quad-tree type. In this case, a minimum boundary of the PU or the TU exists in units of 4×4 blocks. However, since a deblocking filter of the HEVC performs filtering only on the PU or the TU on the 8×8 block boundary as described above, only a part indicated by a bold line in CU#2 of FIG. 7 corresponds to a horizontal edge boundary to be filtered.

Likewise for CU#3 and CU#4, edge boundaries to be filtered are selected in the same way.

As may be seen from FIG. 7, when filtering is performed on one CTU, filtering is not performed on a bottommost edge. Because the bottommost edge of one CTU is filtered together when a topmost edge of a lower CTU is filtered.

Although FIG. 7 only describes horizontal edges in the CTU, the PU boundary and TU located at the 8×8 block boundary for the vertical edge are also determined as the boundary for performing the filtering. Also, as with the horizontal edge, when filtering is performed on one CTU, filtering is not performed on an edge on a rightmost side. Since the edge on the rightmost side based on one CTU is filtered together when the edge boundary on a leftmost side of a right CTU is filtered.

In the video codec such as HEVC, data of an adjacent block is needed to process the edge boundary. Therefore, in order to filter a right edge boundary, data of a right adjacent block is required, and to filter a lower edge boundary, data of a lower adjacent block is required. Accordingly, a rightmost edge boundary of a CTB is filtered when a right adjacent CTB is received and then a leftmost vertical edge boundary of the right adjacent CTB is processed, and a bottommost edge boundary of the CTB is filtered when a bottom adjacent CTB is received and then a topmost horizontal edge boundary of the bottom adjacent CTB is processed.

Figure 8:
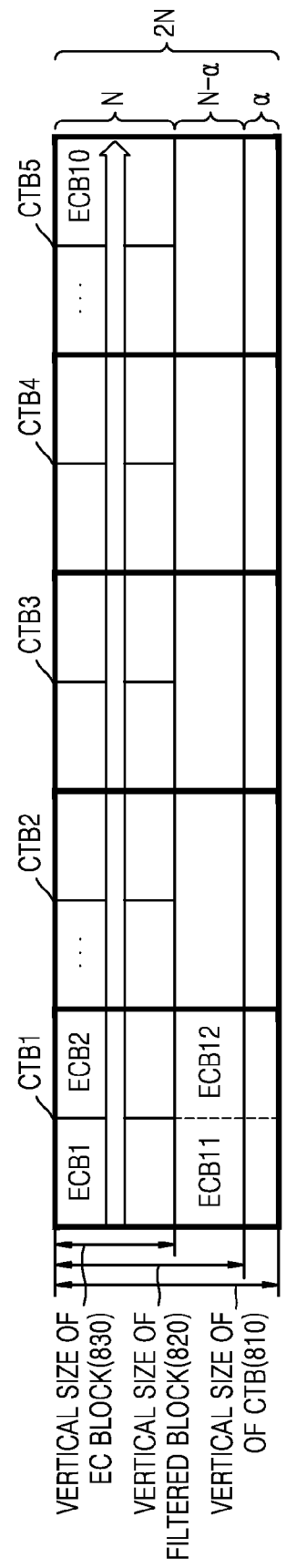
FIG. 8 is a diagram showing a size of each of blocks in one picture and an order in which filtered data is embedded compressed by using a top-down processing method.

FIG. 8 is a diagram showing a size of each of blocks in one picture and an order in which filtered data is embedded compressed by using a top-down processing method.

Filtering of a CTB in one picture proceeds from CTB1, which is a leftmost CTB of a first block row, to the right as shown in FIG. 8, and if processing for CTB1 to CTB5 of the first block row is finished, proceeds from CTB6, which is a left CTB of a second row, to the right again.

Considering the processing order of the CTB, since right adjacent CTBs are continuously filtered in terms of time, there is little data reception delay in a right edge boundary. However, in the case of a lower edge boundary, since processing of the second block row is started after the first block row is processed, a data reception delay occurs in lower adjacent blocks.

As the total size of an image increases or a size of a coding tree block decreases, since time for processing one block row becomes longer, the data reception delay of the lower adjacent blocks becomes larger. As the total size of the image increases, or as the size of the coding tree block decreases, time required to wait for a lower boundary value becomes longer.

As described in FIG. 7, a rightmost edge boundary and a lowermost edge boundary with respect to one CTB are not filtered when the CTB is processed, and thus a size of a filtered block becomes smaller than an original size of the CTB.

Taking FIG. 8 as an example, a vertical size 820 of the filtered block is smaller than a vertical size 810 of the CTB. In FIG. 8, when the vertical size 810 of the CTB is 2N, the vertical size 820 of the filtered block is (2N−α) smaller than 2N. In this case, a size of α depends on a type of filtering and a size of a reference region, and α is an integer of 0 to 2N.

Figure 9:
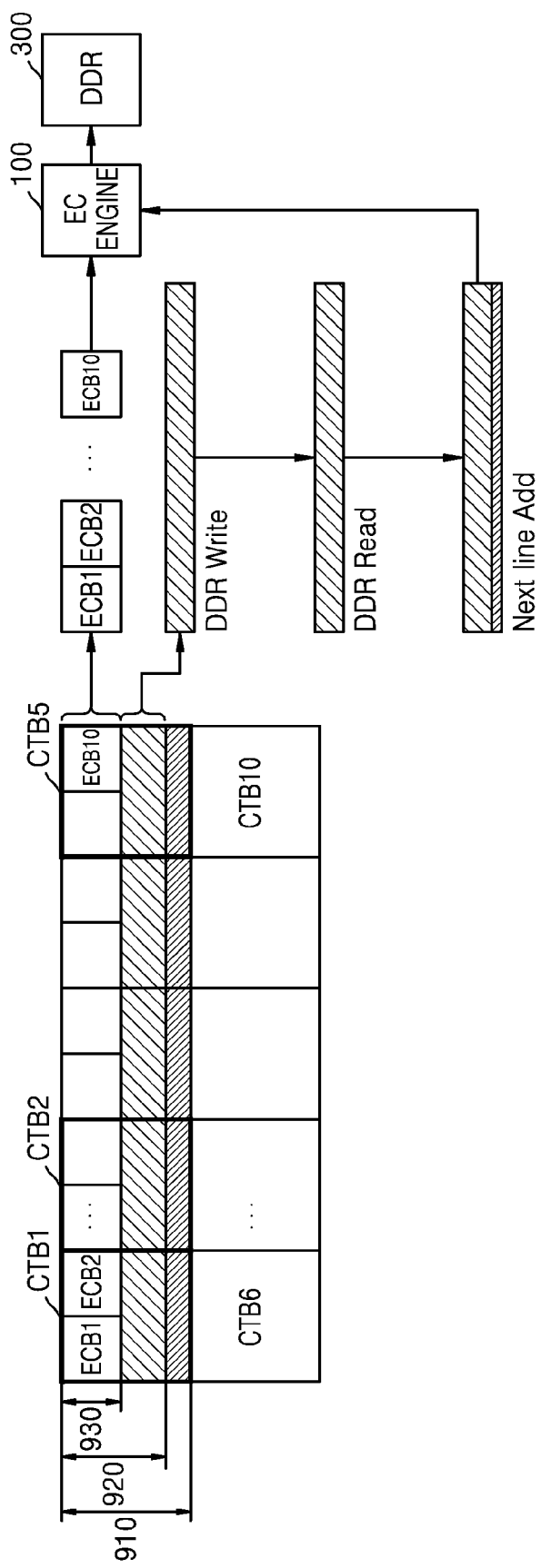
FIG. 9 is a diagram showing a processing method when a size of decoded data for embedded compression is smaller than an embedded compression size.

FIG. 9 is a diagram showing a processing method when a size of decoded data for embedded compression is smaller than the embedded compression size.

Generally, a size of an EC block for embedded compression is smaller than a size of a CTB. For convenience of description, it is assumed that a vertical pixel size 910 of the CTB is 2N and a vertical pixel size 930 of the EC block for embedded compression is N.

If only a first block row is filtered, since the vertical size 920 of the filtered block becomes (2 N−α), in the case of ECB1 to ECB10 corresponding to the first block row for embedded compression, filtered data for embedded compression is prepared.

Therefore, it is possible to perform embedded compression of the vertical size N for the first block row. An embedded compression engine performs embedded compression on ECB1 to ECB10 on which embedded compression may be performed and stores the embedded compressed data in a memory in units of blocks.

However, in the case of a second block row, it may happen that filtered data corresponding to a material for embedded compression is not prepared. For example, when an embedded compression speed is faster than a filtering speed, embedded compression of ECB 10 is completed, but filtered data corresponding to CTB 6 may not be prepared.

In this case, since some data corresponding to a lower end of ECB11 is insufficient, embedded compression may not be performed immediately. After data of CTB6 is prepared later, embedded compression is performed. In order to perform embedded compression later, previously received filtered data is stored in the memory, and when filtered data of a next row is received and embedded compression is enabled, the stored data is retrieved from the memory.

When all the ECB data is prepared by combining the loaded data and the data of the next row, the embedded compression engine sequentially performs embedded compression on ECB11 to ECB20, and stores the embedded compressed data in the memory in units of blocks.

As mentioned above, when 8×8 embedded compression is used for reconstruction of a 4K@60p image, an amount of data to be stored and reloaded for reason of not preparing data of an M×N block is 1GByte per second in HEVC 4:2:2 12 bit and about 879 MByte in AVS2.0 4:2:0 10 bit. Such a phenomenon increases a BUS bandwidth to be occupied for embedded compression and may deteriorate the overall performance of an image system.

In this case, when DDR is used as a memory for storing data, random access is guaranteed and a processing speed may be increased. A memory for storing the embedded compressed data and a memory for storing the filtered data waiting for embedded compression may separately exist.

A main purpose of using embedded compression for a decoder output is to reduce the system BUS bandwidth that is generated in a process of accessing a large amount of data to the memory. However, when embedded compression is performed with a fixed block size, an additional problem as described above causes the system BUS bandwidth to be used more and consequently, the embedded compression efficiency is lowered.

According to an embodiment of the present disclosure, with regard to output data filtered by the decoder, the output data is not M×N, which is a unit of embedded compression processing block, and thus, a repetitive process of writing and reading a data part, image data (M×N1), that should be temporarily stored in and loaded from the memory in the DDR is omitted.

Figure 10:
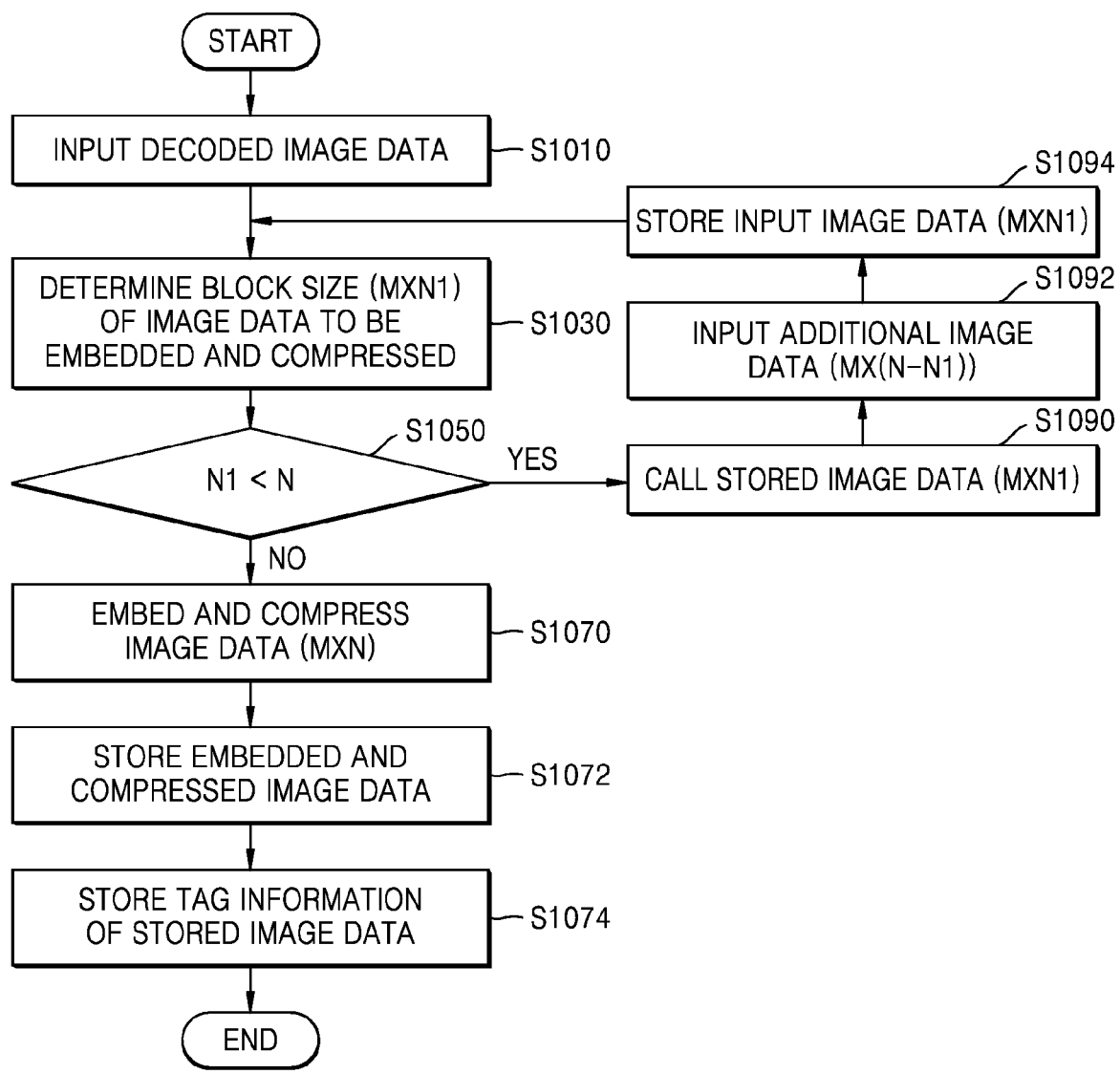
FIG. 10 shows a flowchart of a method of embedding and compressing image data in a system for processing the image data, including an embedded compression engine.

FIG. 10 shows a flowchart of a method of embedding and compressing image data in a system for processing the image data, including an embedded compression engine.

If decoded image data is input to the embedded compression engine (S1010), a block size of the image data to be embedded compressed in units of M×N EC blocks among the input image data is determined (S1030).

For embedded compression with a fixed M×N block size, an amount of data should be an M×N block size. However, considering a decoding process of an actual image signal, data of an M×N block for embedded compression is not always prepared.

In this case, since adjacent pixel blocks of right and left sides are received consecutively, among the image data to be embedded compressed, there is almost no shortage of decoded image data on the left and right sides. However, when an adjacent pixel block of a lower end is not received yet, there may be a shortage of decoded image data on the lower end of the block. Accordingly, a vertical block size N1 of the image data to be embedded compressed among the decoded image data is compared with a vertical block size N of M×N of the EC block unit (S1050).

If the vertical block size N1 of the image data to be embedded compressed is not smaller than the vertical block size N of the EC block as a result of the comparison in step S1050, since all the data for the M×N block for embedded coding is prepared, the EC engine embeds and compresses the decoded image data in the M×N block size (S1070). The embedded compressed image data is stored in a storage unit (S1072), and tag information of the stored image data is also stored (S1074). The tag information is used to identify an amount of embedded compressed data to be read from the memory to decompress embedded compression and the location stored in the memory.

As mentioned above, generally, the tag information is not compressed separately, but if a data size of an image is large, an amount of tag information to be managed is increased, and thus the tag information may also be compressed and stored as needed. The compressed and stored tag information is further decompressed when the tag information stored for reading the embedded compressed data is called.

Embedded compression may be either lossy or lossless compression. Since lossless compression resultant data has a variable size, tag information is required in reading compressed data stored for decompression. However, since compressed result data of lossy compression has a fixed size, tag information is not required separately, and thus step S1074 of storing the tag information for the stored image data may be omitted.

In this case, if a storage unit may be the memory 300 shown in FIG. 2 or DPBs 301, 302, . . . . At this time, if the memory 300 is a DDR RAM (Double Data Rate Random Access Memory), random access may be guaranteed.

As a result of comparison in step S1050, if the vertical block size N1 of the image data to be embedded compressed is not smaller than the vertical block size N of the EC block, since no data for M×N block embedded coding is prepared, input image data is stored (S1090) until all the data for M×N block embedded coding is prepared.

In the case of video codec, the data to be embedded compressed and stored must be data processed to a codec, specifically, a final output filter of a decoder. However, since the number of filter taps is different depending on a type of video codec, filtering is not performed in accordance with a block sync due to the characteristics of a filter, and filtering is performed across blocks, data of M×N blocks for embedded compression may not be prepared.

An output filter of a video decoder performs filtering over the blocks by the video encoding characteristic using data of the lower block for encoding of lower data (pixel) of an upper block when viewed in order of block processing.

When decoding of the video blocks of a row being processed is completed, decoding of video blocks of a next row is started, and additional image data is input to the EC engine (S1092). When the additional image data is inputted, the EC engine calls the image data being stored (S1094) and determines the block size of the image data to be embedded compressed again (S1030).

Therefore, there is a case where some data must be stored again for embedded compression of the M×N block size, which increases a BUS bandwidth used for embedded compression.

If 8×8 embedded compression is used for reconstruction of a current 4K@60p image, an amount of data to be stored and read back due to the reason that data of the M×N block is not prepared is 1 GByte per second in 12 bits of HEVC 4:2:2, and about 879 MByte per second in AVS2.0 4:2:0 10 bit.

A main purpose of using embedded compression for a decoder output is to reduce a system BUS bandwidth that is generated in a process of accessing a large amount of data to the memory. However, when embedded compression is performed with a fixed block size, the additional problem as described above causes the system BUS bandwidth to be used more and consequently, the embedded compression efficiency is lowered.

Figure 11:
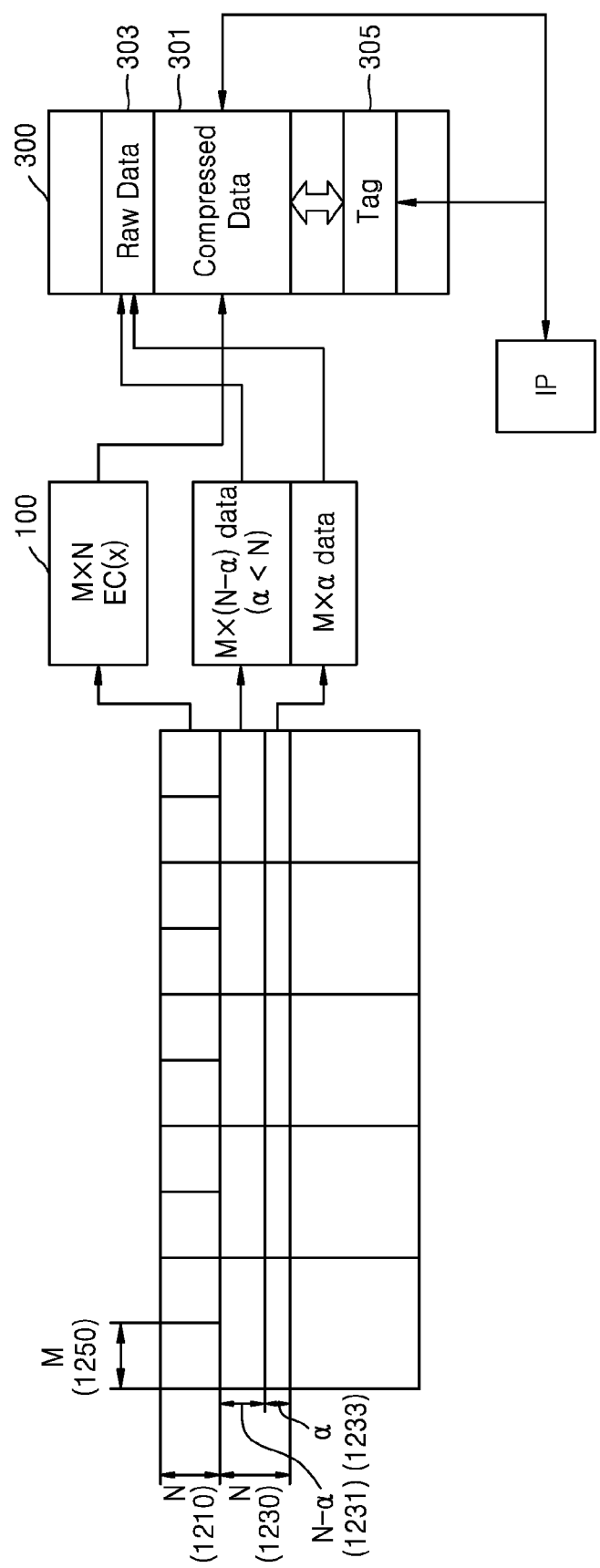
FIG. 11 illustrates a data processing process of a method of embedding and compressing image data in a system for processing the image data, including an embedded compression engine, according to an embodiment of the present disclosure.

FIG. 11 illustrates a data processing process of a method of embedding and compressing image data in a system for processing the image data, including an embedded compression engine according to an embodiment of the present disclosure.

In the embodiment of FIG. 11, it is assumed that a horizontal size of an embedded compression block (ECB) for embedded compression is fixed to M 1115 and a vertical size is fixed to N 1110, and a first ECB row 1110 is completely filled with data corresponding to the block vertical size N, and a second ECB row 1130 is in a state 1131 filled with only (N−α) since the data of the block vertical size is insufficient. At this time, α is an integer of 0<α<N.

Since the first ECB row 1110 is completely filled with the data corresponding to the block vertical size N, embedded compression is performed in an M×N size in the embedded compression engine EC(x). The data compressed into the M×N size is stored in a compressed data region 301 of a memory. In a tag region 305 where tag information is stored, information indicating that data of a corresponding block is embedded compressed, a size of compressed data, etc. are stored.

Figure 12:
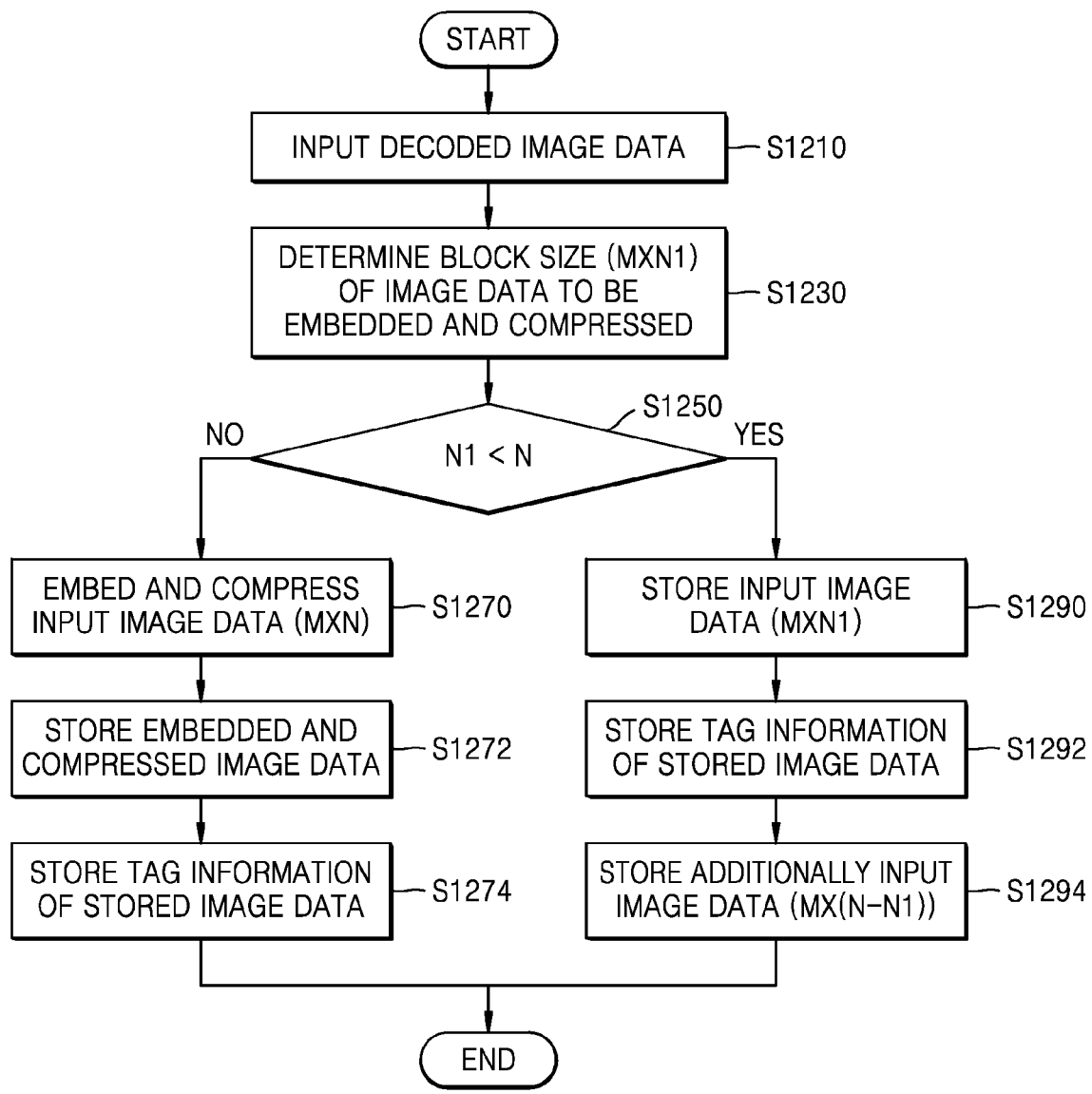
FIG. 12 shows a flowchart of a method of embedding and compressing image data in a system for processing the image data, including an embedded compression engine, according to an embodiment of the present disclosure.

Since the second ECB row 1130 is not completely filled with the data corresponding to the block vertical size N, and is in the state 1131 prepared with only (N−α), embedded compression of the M×N size may not be performed. In this case, according to an embodiment of the present disclosure as shown in FIG. 12, after receiving additional data and waiting for the M×N size data to be prepared, embedded compression is not performed and previously received data of the M×(N−α) size is stored in a raw data region 303 of the memory in the form of raw data, and information indicating that the data of the corresponding block is not compressed, a size of uncompressed data, etc. are stored in the tag region 305 where the tag information is stored.

Thereafter, when the additional data is input and data 1133 of M×α on a lower side of the second ECB row 1130 is filled, the received M×α size data is stored in the raw data region 303 of the memory in the form of raw data, and information indicating that the data of the corresponding block is not compressed, a size of uncompressed data, etc. are stored in the tag region 305 where the tag information is stored.

When the data of the second ECB row 1130 is stored in the memory in the form of raw data, an AXI protocol may be used. The AXI protocol may be a bus protocol suitable for high speed/high performance systems, as compared to the existing on-chip bus protocol.

The AXI protocol operates independently of channels related to read, write, address, write response, etc., and has transaction characteristics such as a multiple-outstanding address, write data interleaving, and the like.

Because the AXI protocol has separate data read and write channels, it is possible to write data simultaneously with reading the data, and the AXI protocol may increase throughput of the system bus.

Also, system performance may be improved by using the AXI protocol because the AXI protocol performs out-of-order transactions that may be processed irrespective of an addressing order by the characteristic of multiple-out standing address.

In FIG. 11, the tag information is managed through an IP, but the tag information may be partly or wholly managed through the EC as described above. In this regard, the IP is an intellectual property core of a codec, which means a specific module or core in the codec that transfers data to an embedded compression engine. A typical IP core is, but not limited to, a post filter, which is a final step of codec processing.

FIG. 12 shows a flowchart of a method of embedding and compressing image data in a system for processing the image data, including an embedded compression engine according to an embodiment of the present disclosure.

In a method shown in FIG. 10, when data for embedded compression is smaller than M×N that is an EC block size, embedded compression is not performed and additional data is input to wait for the data for embedded compression to satisfy M×N which is the EC block size, to this end, the input image data is stored (1050), and when additional image data is input (1052), the stored image data is called (1054). If a process of reading and writing a large amount of data is repeated, access to a system BUS is increased, and a system BUS bandwidth is used more, and accordingly embedded compression efficiency is lowered.

In the method of embedding and compressing the image data according to an embodiment of the present disclosure shown in FIG. 12, if data of an M×N block for embedded compression is prepared, the same process as that shown in FIG. 10 is performed.

If decoded image data is input to the embedded compression engine (S1210), a block size of image data to be embedded compressed in units of M×N EC blocks among the input image data is determined (S1230).

For embedded compression with a fixed M×N block size, an amount of data should be the M×N block size. However, considering a decoding process of an actual image signal, the data of the M×N block for the embedded compression is not always prepared.

As described above, data of left and right sides of a block is scarcely insufficient, but data of a bottom end of the block may be insufficient. Accordingly, the vertical block size N1 of the image data to be embedded compressed among the decoded image data is compared with the vertical block size N of the EC block unit M×N (S1250).

If the vertical block size N1 of the image data to be embedded compressed is not smaller than the vertical block size N of the EC block as a result of comparison of step 1250, since the data for embedded coding of the M×N block are all prepared, the EC engine embeds and compresses the decoded image data in the M×N block size (S1270). The embedded compressed image data is stored in a storage unit (S1272), and tag information of the stored image data is also stored (S1274). The tag information is used to identify an amount of embedded compressed data to be read from a memory to unpack embedded compression and a location stored in the memory.

In this case, if the storage unit may be the memory 300 shown in FIG. 2 or the DPBs 301, 302, . . . . In this regard, if the memory 300 is a DDR RAM (Double Data Rate Random Access Memory), a random access may be guaranteed.

As a result of comparison in step 1250, if it is determined that the vertical block size N1 of the image data to be embedded compressed is not smaller than the vertical block size N of the EC block, the input image data of M×N1 size is stored in the memory (S1290). At this time, the received data of M×N1 size is stored in the form of raw data, and tag information of the image data stored in the form of raw data is stored in the memory (S1292). The tag information of the stored image data includes information about a size of the stored image data and a stored position.

When the decoded image data is additionally input, the additional input image data of M×(N−N1) size is stored in the memory in the form of raw data (S1294). When the additional input image data is stored, a position at which the additional input image data is to be stored is determined based on tag information of the already stored image data.

Unlike the method disclosed in FIG. 10, in the method disclosed in FIG. 12, it is not confirmed whether additional image data is input later to satisfy the embedded compression size M×N. Also, even if the additional image data is input, the received M×N1 size data is stored in the memory in the form of raw data without performing embedded compression.

Embedded compression is performed for the purpose of facilitating storage and processing of data by reducing capacity of the data. However, as in the method disclosed in FIG. 10, if all the data for M×N block embedded coding is not prepared, a method of storing input image data until all the data for M×N block embedded coding are prepared, when additional image data is inputted, calling the stored image data may cause a load on the system in a process of reading and writing the data and may degrade the overall system performance.

As mentioned above, when 8×8 embedded compression is used for reconstruction of a 4K@60p image, an amount of data to be stored and read back since M×N block data is not prepared is 1GByte per second in HEVC 4:2:2 12 bit and about 879 MByte in AVS 2.0 4:2:0 10 bit.

As in the method disclosed in FIG. 12, if all the data for M×N block embedded coding is prepared, embedded compression is performed and stored in the memory. If all the data for M×N block embedded coding is not prepared, by storing raw data in the memory in accordance with a block size only, the system performance may be improved by reducing the process of reading and writing the data.

At this time, it is possible to directly store image data in which an IP is input in the memory and transmit only information indicating that the corresponding data is not compressed to the EC engine, and thus the EC engine may manage the tag information. Alternatively, it is possible to transmit the image data in which the IP is input and the tag information to the EC engine, and thus the EC engine may directly store the image data and the tag information in the memory.

The IP or the EC engine may determine a size of the already stored image data and whether the already stored image data is compressed based on the stored tag information, and store additional image data based on the determined size of the already stored image data and whether the already stored image data is compressed.

Figure 13:
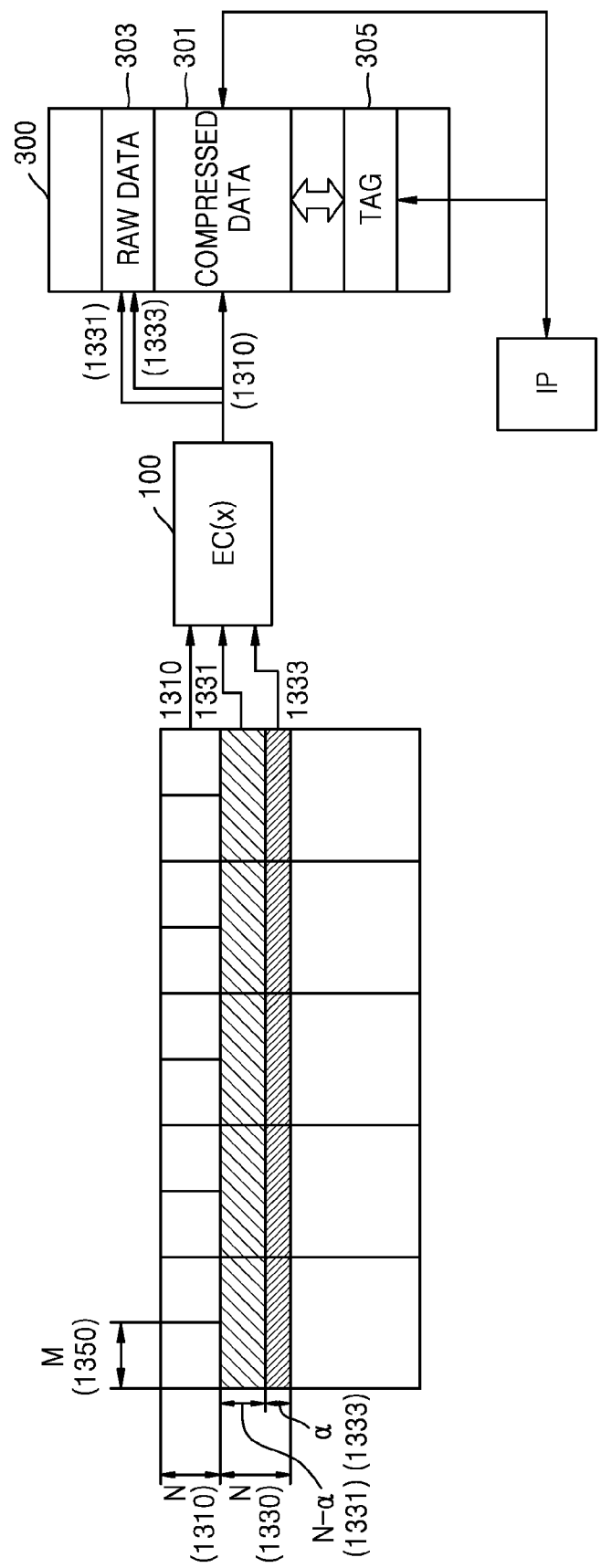
FIG. 13 illustrates a data processing process of a method of embedding and compressing image data in a system for processing the image data, including an embedded compression engine, according to another embodiment of the present disclosure.

FIG. 13 illustrates a data processing process of a method of embedding and compressing image data in a system for processing the image data, including an embedded compression engine according to another embodiment of the present disclosure.

In the embodiment of FIG. 13, it is assumed that a horizontal size of an embedded compression block (ECB) for embedded compression is fixed to M 1350 and a vertical size is fixed to N 1310, and a first ECB row 1310 is completely filled with data corresponding to the block vertical size N, and a second ECB row 1330 is in a state 1331 filled with only (N−α) since the data of the block vertical size is insufficient. At this time, a is an integer of 0<α<N.

Since the first ECB row 1310 is completely filled with the data corresponding to the block vertical size N, embedded compression is performed in an M×N size in the embedded compression engine EC(x). The data compressed into the M×N size is stored in the compressed data region 301 of a memory. In the tag region 305 where tag information is stored, information indicating that data of a corresponding block is embedded compressed, a size of compressed data, etc. are stored.

Since the second ECB row 1330 is not completely filled with the data corresponding to the block vertical size N, and is in the state 1331 prepared with only decoded data corresponding an upper pixel (N−α), embedded compression of the M×N size may not be performed. In this case, unlike the embodiment of the present disclosure as shown in FIG. 12, in the embodiment shown in FIG. 13, since only a part of data exists as in the second ECB rows 1331 and 1333, the data is transmitted to the embedded compression engine even if embedded compression may not be performed in the M×N size.

Specifically, the embedded compression engine determines a size of the transferred data. When the block size does not satisfy M×N that is the embedded compression size, the embedded compression engine determines that embedded compression is not to be performed and directly stores the transferred data in the form of raw data in the raw data region 303.

Therefore, since the block size M×(N−α) of the data 1331 corresponding to an upper end of the second ECB row 1330 does not satisfy the embedded compression size M×N, the embedded compression engine 100 determines that embedded compression is not performed on the corresponding data and directly stores the transferred data in the raw data region 303 of the memory in the form of raw data.

Thereafter, when the data 1333 corresponding to a lower end of the second ECB row 1330 is input, since the block size (M×α) of the data 1333 does not satisfy the embedded compression size M×N, the embedded compression engine 100 determines that embedded compression is not performed on the data 1333 like the data 1331 and directly stores the transferred data in the raw data region 303 of the memory in the form of raw data.

At this time, in an IP module, information indicating that the data of the blocks corresponding to the data 1331 and 1333 is not compressed and s size of uncompressed data, etc. are stored in the tag region 305 where the tag information is stored.

In FIG. 13, although the tag information is managed through the IP, as described above, all or a part of the tag information may be managed through the embedded compression engine.

Figure 14:
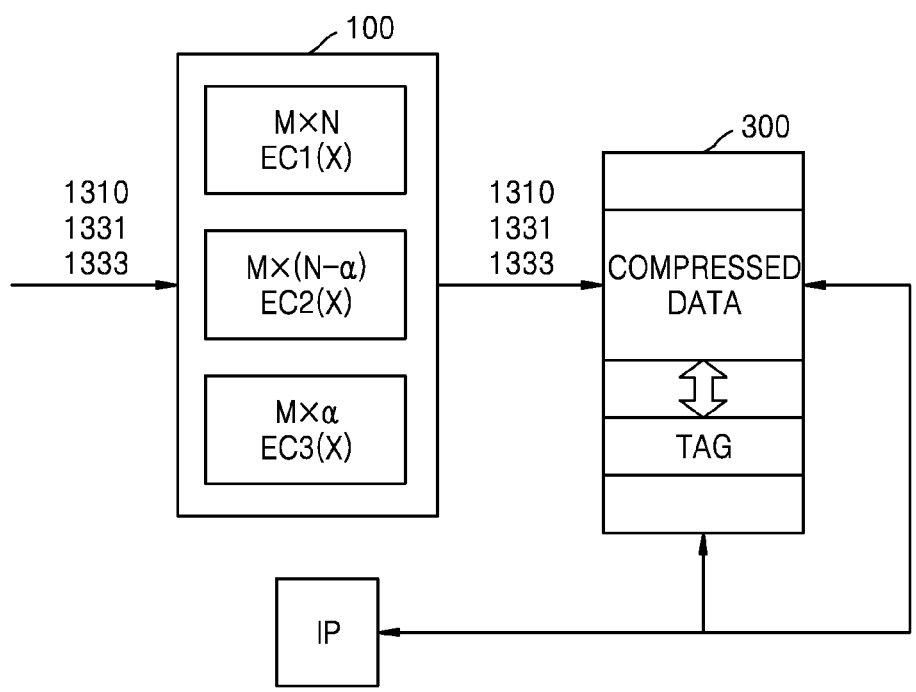
FIG. 14 illustrates a data processing process of a method of embedding and compressing image data in a system for processing the image data, including an embedded compression engine, according to another embodiment of the present disclosure.

FIG. 14 illustrates a data processing process of a method of embedding and compressing image data in a system for processing the image data, including an embedded compression engine according to another embodiment of the present disclosure.

Although only the EC engine 100 and the memory 300 are shown in FIG. 14, it is assumed that a picture configuration, a coding tree block, and an embedded compression block for embedded compression are as shown in FIG. 13. However, in the embodiment of FIG. 13, a horizontal size of the embedded compression block is fixed to M 1350 and a vertical size is fixed to N 1310, whereas in the embodiment of FIG. 14, when a size of the embedded compression block is variable.

In particular, it is assumed that the vertical size N of the embedded compression block is variable. As described above, this is because image data in an image codec such as HEVC is processed in units of blocks, and due to a characteristic of a video codec that uses data of a lower block to process data below the block, processing and reception of the data below the block are delayed.

In the embodiment of FIG. 14, it is assumed that a first ECB row is filled with data corresponding to the block vertical size N, and a second ECB row is filled with only (N−α) since the data of the block vertical size N is insufficient. At this time, α is an integer of 0<α<N.

Since the first ECB row is completely filled with the data corresponding to the block length size N, an embedded compression engine EC1(x) performs embedded compression in an M×N size. The data embedded compressed in the M×N size is stored in the compressed data area 301 of a memory, and data of the corresponding block is embedded compressed. In the tag region 305 where tag information is stored, information indicating that data of a corresponding block is embedded compressed, a size of compressed data, etc. are stored.

Although the second ECB row is not completely filled with the data corresponding to the block vertical size N and is prepared with only (N−α), in the embodiment of FIG. 14, since the block vertical size of the ECB may be variably embedded compressed, an embedded compression engine EC2(x) performs embedded compression on decoded data corresponding to an upper pixel (N−α) among the data of a second row in M×(N−α) size. The data embedded compressed in the M×(N−α) size is stored in the compressed data region 301 of the memory. In the tag region 305 where tag information is stored, information indicating that data of a corresponding block is embedded compressed, a size of compressed data, etc. are stored.

Thereafter, when the decoded data corresponding to a lower pixel a of the second ECB row is inputted, the embedded compression engine 100 performs embedded compression on the data through the embedded compression engine EC2(x) in the M×α size. The data embedded compressed in the M×α size is also stored in the compressed data region 301 of the memory. In the tag region 305 where tag information is stored, information indicating that data of a corresponding block is embedded compressed, a size of compressed data, etc. are stored.

In FIG. 14, although the tag information is managed through an IP, the tag information may be wholly or partly managed through the embedded compression engine as in FIG. 13.

Figure 15:
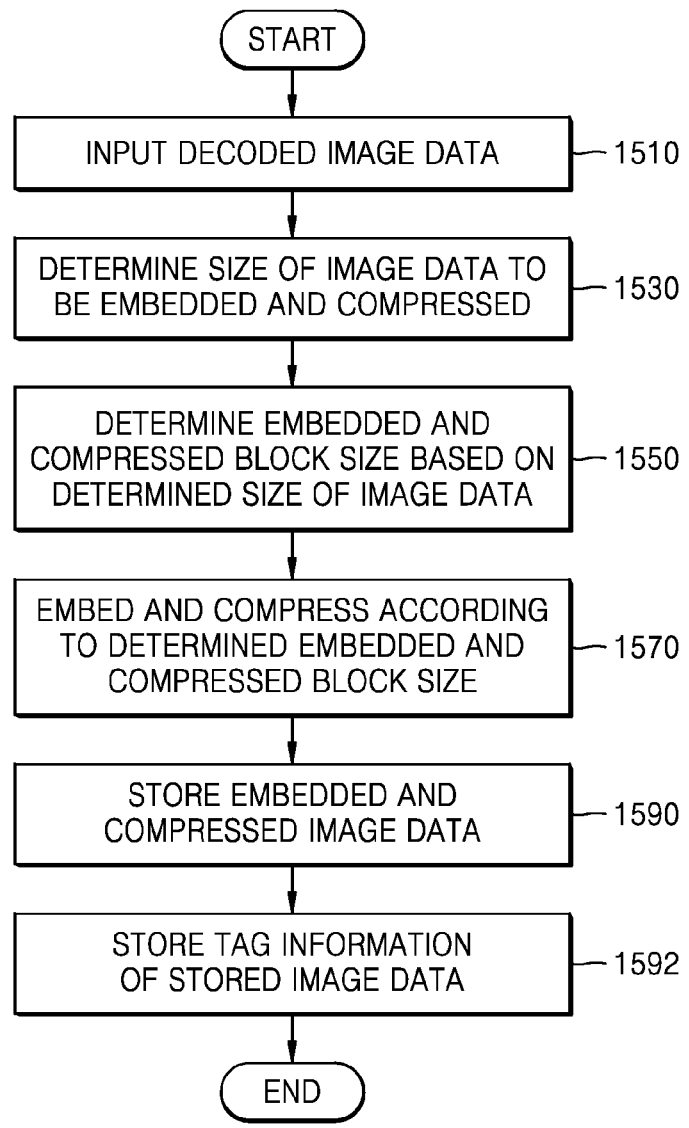
FIG. 15 is a flowchart of a method of embedding and compressing image data in a system for processing the image data, including an embedded compression engine, according to another embodiment of the present disclosure.

FIG. 15 is a flowchart of a method of embedding and compressing image data in a system for processing the image data, including an embedded compression engine according to another embodiment of the present disclosure.

In the method of processing image data according to an embodiment of the present disclosure shown in FIG. 15, embedded compression is performed in a variable block size as in the embodiment of FIG. 14, rather than performing embedded compression in a fixed block size.

When decoded image data is input (1510), a size of the image data to be embedded compressed is determined (1530).

Since processing of image data for one picture is performed in a top-down manner going from left to right and from top to bottom, the embedded compressed block size is determined 1550 based on the vertical pixel size N1 of the decoded data.

As described above, image data in a video codec such as HEVC is processed in units of blocks. Processing and reception of data below a block are delayed due to the characteristics of a video codec using data of a lower block for processing the data below the block.

In the embodiment of FIG. 15, since the embedded compression block size, especially the vertical size of the embedded compression block, is variable, embedded compression is performed (1570) in M×N1 regardless of the vertical pixel size N1 of the decoded data.

When embedded compression is completed, the embedded compressed image data is stored in a storage unit (1590), and tag information of the stored image data is also stored (1592). The tag information is used to identify an amount of the embedded compressed data to be read from the memory to unpack embedded compression and a stored location in the memory.

If the vertical pixel size N1 of the data to be embedded compressed is larger than the maximum value Nmax of the vertical size of the embedded compression block, embedded compression is performed in a block size of M x Nmax and updated to N1=N1−Nmax and then a process from steps 1510 to steps 1592 is repeated.

In the above embodiment, the method of variably determining the embedded compression block size based on a vertical pixel size of the decoded data has been described.

When the vertical size of the decoded data is N1 and the vertical size of the embedded compression block is determined as N1, in order to variably determine the size of the embedded compression block, there is a disadvantage that an embedded compression engine is theoretically required by a maximum vertical size of the embedded compression block.

Figure 16:
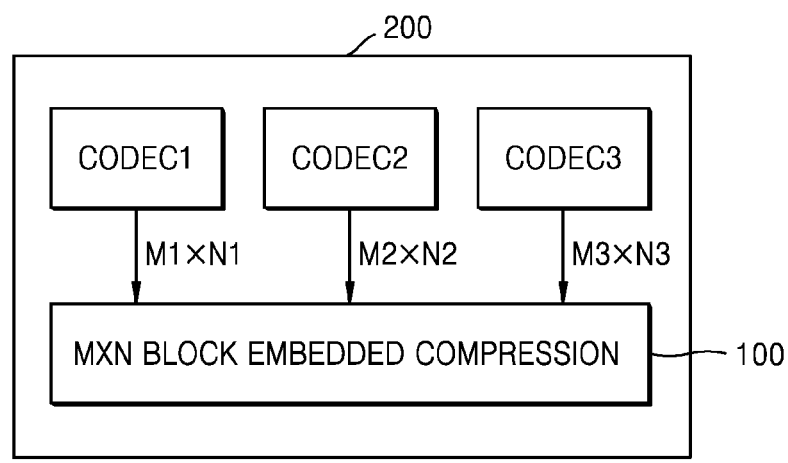
FIG. 16 illustrates a method of embedding and compressing image data in a system for processing the image data, including an embedded compression engine, according to another embodiment of the present disclosure.

FIG. 16 illustrates a method of embedding and compressing image data in a system for processing the image data, including an embedded compression engine according to another embodiment of the present disclosure.

In the embodiment of FIG. 16, a method of embedding and compressing the image data more efficiently by using a characteristic of block size of data output from a decoder output filter having a value determined according to a type of a video codec a is disclosed.

In the decoder 200 of FIG. 16, it is assumed that three kinds of codecs are used in a decoding process according to a type of a codec in which data is encoded. Since the block size of the data output from the decoder output filter has the value determined according to the type of the video codec, when the data is decoded using a codec 1, the block size of the output data of the output filter may be M1×N1, when the data is decoded using a codec 2, the block size of the output data of the output filter may be M2×N2, and when the data is decoded using a codec 3, the block size of the output data of the output filter may be M3×N3.

In this regard, when the embedded compression block size is determined as M×N, if M is determined as the greatest common divisor of M1, M2, and M3, and N is determined as the greatest common divisor of N1, N2, and N3, one embedded compression engine may be used and embedded compression may be performed more efficiently irrespective of a type of a codec.

In such a case, the data size for embedded compression may not be insufficient.

Figure 17:
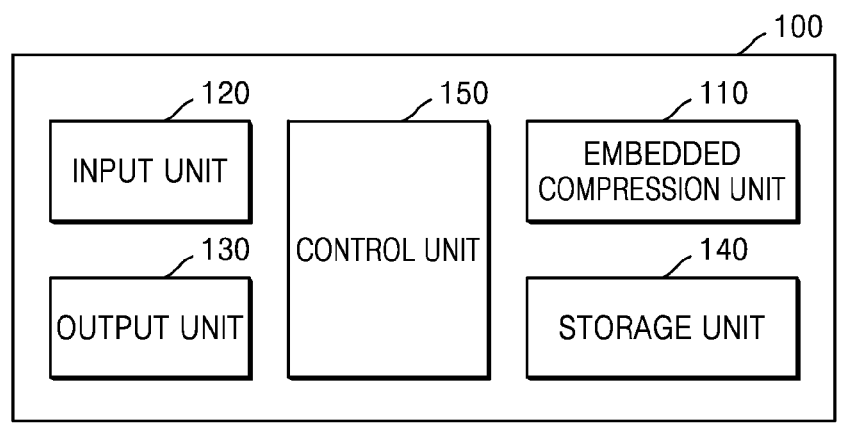
FIG. 17 is a detailed configuration diagram of an embedded compression apparatus according to an embodiment of the present disclosure.

FIG. 17 is a detailed configuration diagram of an embedded compression apparatus according to an embodiment of the present disclosure.

As shown in FIG. 17, the embedded compression apparatus 100 according to an embodiment of the present disclosure includes an embedded compression unit 110, an input unit 120, an output unit 130, a storage unit 140, and a control unit 150.

The embedded compression unit 110 embeds and compresses decoded image data transferred from the input unit 120 in units of blocks, and transmits the embedded compressed image data to the output unit.

The input unit 120 receives output filter output data of a decoder and transfers the input data to the embedded compression unit 110.

The output unit 130 receives and outputs the embedded compressed image data from the embedded compression unit 110 such that the embedded compressed image data may be stored in a DPB (not shown).

The storage unit 140 may store the embedded compression block size and the like determined by the controller 150 when necessary according to an embodiment.

The control unit 150 controls entire operations of the embedded compression apparatus 100 and controls the embedded compression unit 110, the input unit 120, the output unit 130, and the storage unit 140 such that the output filter output data of the decoder may be efficiently embedded.

The embodiments of the present disclosure described above may be implemented in the form of program instructions that may be executed through various computer components and recorded in a computer-readable recording medium. The computer-readable recording medium may include program commands, data files, data structures, and the like, alone or in combination. The program instructions recorded on the computer-readable recording medium may be those specifically designed and configured for the present disclosure or may be those known and used by those of ordinary skill in the computer software arts. Examples of computer-readable media include magnetic media such as hard disks, floppy disks and magnetic tape, optical recording media such as CD-ROM and DVD, magneto-optical media such as floptical disks, medium, and hardware devices specifically configured to store and execute program instructions, such as ROM, RAM, flash memory, and the like. Examples of program instructions include machine language code, such as those generated by a compiler, as well as high-level language code that may be executed by a computer using an interpreter or the like. The hardware device may be modified into one or more software modules for performing the processing according to the present disclosure, and vice versa.

Although the present disclosure has been described by specific matters such as detailed components, embodiments, and drawings, they have been provided only for assisting in the entire understanding of the present disclosure. Therefore, the present disclosure is not limited to the above embodiments. Various modifications and changes may be made by those of ordinary skill in the art to which the present disclosure pertains from this description.

Therefore, the spirit of the present disclosure should not be limited to the above-described embodiments and the following claims as well as all modified equally or equivalently to the claims are intended to fall within the scopes and spirits of the disclosure.

The invention claimed is:

1. A method of performing embedded compression (EC) on image data, the method comprising:
    obtaining decoded image data that is decoded from encoded image data;
    determining a block size of image data waiting for embedded compression from among the received image data; and
    comparing the determined block size of the image data waiting for embedded compression with an EC block size that is an embedded compression unit,
    if the determined block size of the image data waiting for embedded compression is equal to or greater than the EC block size, embedded compressing the received image data; and
    if the determined block size of the image data waiting for embedded compression is smaller than the EC block size, storing tag information of the received image data.

2. The method of claim 1, further comprising: if the determined block size of the image data waiting for embedded compression is smaller than the EC block size,
    a) storing the image data waiting for embedded compression; and
    b) if additional decoded image data to be embedded compressed is input, storing the additional image data based on the tag information.

3. The method of claim 1, wherein the tag information is received from an Intellectual Property (IP) core of a codec.

4. The method of claim 1, wherein the tag information indicates that the decoded image data is non-compressed image data.

5. A method of performing embedded compression (EC) on image data, the method comprising:
    obtaining decoded image data that is decoded from encoded image data;
    determining a block size of image data to be embedded compressed from among the received image data; and
    comparing the determined block size with a first EC block size for embedded compression,
    if the determined block size is equal to or greater than the first EC block size, embedded compressing the received image data; and
    if the determined block size is smaller than the first EC block size,
    a) embedded compressing the image data, which is to be embedded compressed, in a second EC block size determined according to the determined block size; and
    b) storing the embedded compressed image data and tag information of the embedded compressed data.

6. The method of claim 5, wherein the second EC block size is determined based on a vertical block size of the received image data.

7. The method of claim 6, wherein the vertical block size of the second EC block size is a maximum common divisor of vertical block sizes of the received image data.

8. An apparatus for performing embedded compression (EC) on image data, the apparatus comprising:
    an input unit configured to obtain decoded image data that is decoded from encoded image data;
    a control unit configured to determine a block size of image data waiting for embedded compression from among the received image data and compare the determined block size of the image data waiting for embedded compression with an EC block size that is an embedded compression unit; and
    an embedded compression unit configured to, if the determined block size of the image data waiting for embedded compression is equal to or greater than the EC block size, embedded compress the received image data, and if the determined block size of the image data waiting for embedded compression is smaller than the EC block size, store tag information of the received image data.

9. The apparatus of claim 8, further comprising: if the determined block size of the image data waiting for embedded compression is smaller than the EC block size, a storage unit configured to a) store the image data waiting for embedded compression, and b) if additional decoded image data to be embedded compressed is input, store the additional image data based on the tag information.

10. The apparatus of claim 8, wherein the tag information is received from an Intellectual Property (IP) core of a codec.

11. The apparatus of claim 8, wherein the tag information indicates that the decoded image data is non-compressed image data.

12. A non-transitory computer readable recording medium having recorded thereon a computer program for implementing the method of claim 1.

* * * * *